United States Patent
Sholl

[15] 3,649,299

[45] Mar. 14, 1972

[54] METHOD OF LIMITING THE DEPTH OF PENETRATION OF TENDERIZING AND/OR FLAVORING LIQUIDS INTO MEAT

[72] Inventor: Jeffrey John Sholl, 2735 A N. Nathan Ln., Plymouth, Minn.

[22] Filed: Mar. 17, 1970

[21] Appl. No.: 646

[52] U.S. Cl...................................99/107, 99/159, 99/254, 128/173 H
[51] Int. Cl........................................A22c 18/00
[58] Field of Search.................99/107, 15 R, 254, 255, 256, 99/257; 128/173 H

[56] References Cited

UNITED STATES PATENTS 3,436,230    4/1969    Harper et al.............................99/159

*Primary Examiner*—Hyman Lord
*Attorney*—Ronald E. Lund, James V. Harmon and M. Paul Hendrickson

[57] ABSTRACT

The depth to which injected liquids penetrate animal tissue is limited by injecting the liquid in a plurality of streams with the axes of streams positioned to intersect at a focal point located within the tissue or at the surface of the tissue. The impact of the streams against one another causes a dissipation of energy and spreading out of the liquid in the streams thereby reducing further penetration.

4 Claims, 3 Drawing Figures

PATENTED MAR 14 1972

3,649,299

INVENTOR.
JEFFREY J. SHOLL
BY
James V. Harmon
ATTORNEY

METHOD OF LIMITING THE DEPTH OF PENETRATION OF TENDERIZING AND/OR FLAVORING LIQUIDS INTO MEAT

Many prior devices have been proposed for injecting medicinal substances into animal tissue or for injecting preservatives and flavoring materials into meat products. In recent years attempts have been made to avoid the use of needles for this purpose in an effort to lessen the danger of microbial contamination.

Preliminary work conducted in the development of the present invention demonstrated that meat products such as whole pieces of raw chicken could be injected with liquids using either needles or high pressure nozzles. Raw chicken breasts which were injected with oil and later cooked had a better distribution of the injected liquid and were more tender than pieces that were injected with water. The tests also showed that injection was effective in introducing flavors, colors or other materials including melted butter, salt, enzymes, etc. It was learned that liquid injection carried out at a high-enough pressure to penetrate the skin without the requirement of a needle (hereinafter referred to as jet injection) is much more simply accomplished than needle injection. Moreover, it lends itself readily to automation and is suited for use in injecting pieces which contain bones close to the surface since contact between the piece being injected and the injection equipment is unnecessary. A further advantage that results from the absence of contact between the nozzle and the injected piece is the impossibility of microbial transfer from the nozzle to the material that is being injected.

In the course of these tests, it was found that jet injection had one serious shortcoming; when the pressure of the jet was raised sufficiently to penetrate the piece, the jet had a tendency to pierce through the entire piece and emerge from the other side or produce a pocket of liquid beneath the skin on the other side of the piece being injected. This was particularly true of relatively thin pieces such as wings and thighs or thin portions of the breast meat.

It is of course known to inject tenderizing and/or flavoring liquids into meat products. For example, U.S. Pat. No. 3,016,004 suggests using an injection nozzle adapted to contain a spiral insert to obtain better distribution of the injected liquid. The nozzle, however, contacts the meat product and there is no provision for limiting penetration.

The problem of limiting penetration depth has been recognized in medical applications. It is disclosed in U.S. Pat. No. 3,140,713 that an oblique or diagonally oriented injected jet can partially offset the variation in penetration depth that occurs primarily due to differences in the strength of the skin. This method is, however, only partially effective since penetration itself is not affected by the angle of incidence of the stream, i.e., the stream itself passes the same distance through the tissue whether normal to the surface or at an oblique angle. Accordingly, the patented method is not suited for a jet that normally penetrates further than the length or width of the piece of tissue being injected. This is a problem particularly in the injection of meat products in which the size of the piece usually varies greatly from one injection to the next.

In view of these and other defects of the prior art, it is an object of the present invention to provide an improved jet injection apparatus and method having the following characteristics and advantages: *a*) the ability to effectively limit the depth of penetration of the jet; *b*) the ability to vary pressure widely with little danger of the jet penetrating through the entire thickness of the material being injected; *c*) the ability to safely inject polar and nonpolar materials either with or without dissolved solids; *d*) to reduce the size of puncture marks sufficiently so that the amount of injected liquid that escapes through the puncture opening is negligible; *e*) to operate efficiently and reliably over an extended period of time; and *f*) to make unnecessary physical contact between the injecting nozzle and the material being injected.

These and other objects of the invention will become apparent in view of the following specification and drawing wherein.

Figures 1, 2, 3:
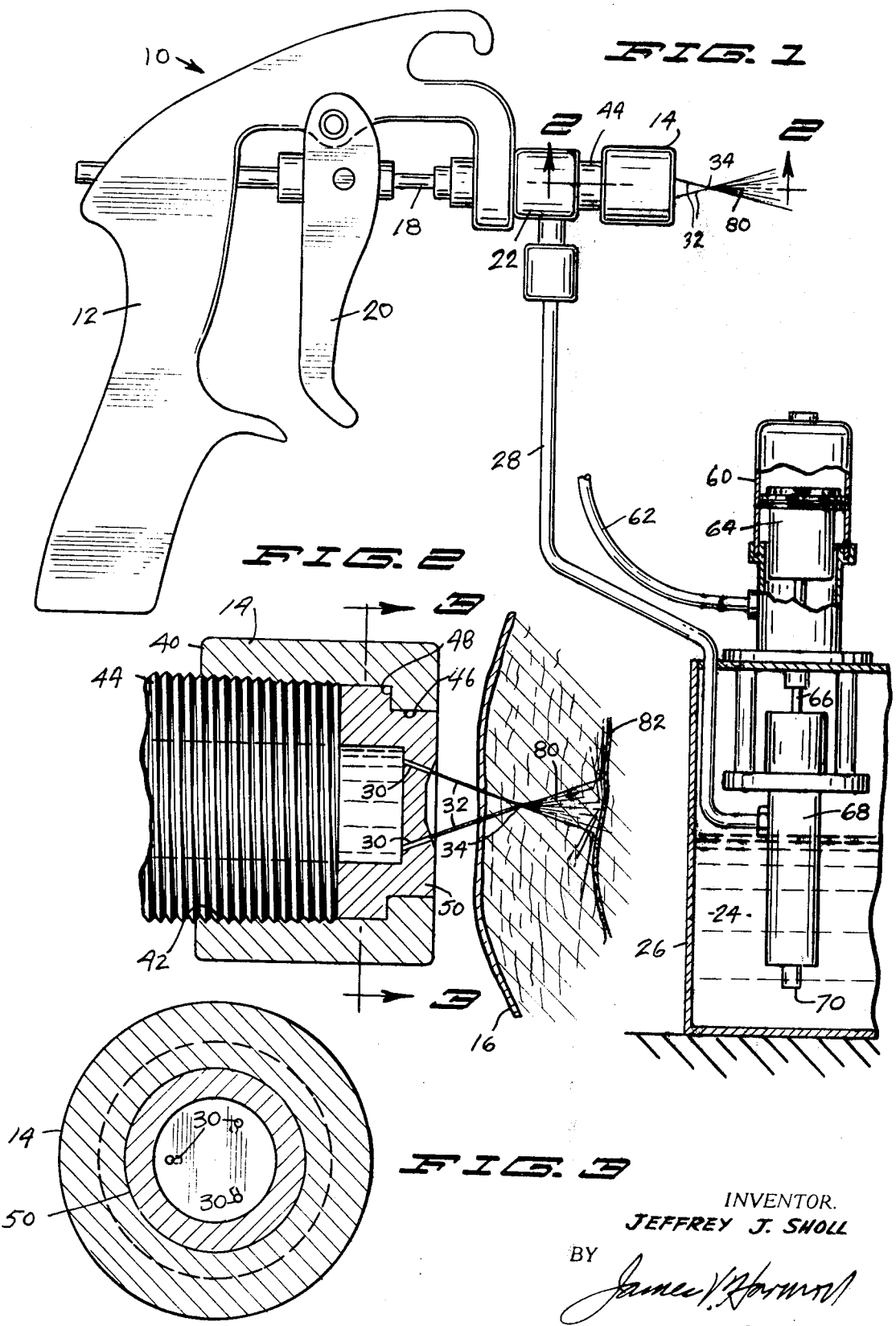
FIG. 1 is a semidiagrammatic view showing a pump, supporting handle and nozzle embodying the invention.
FIG. 2 is a vertical cross-sectional view taken on line 2—2 of FIG. 1 but on a larger scale showing the nozzle as it appears when injecting a liquid into animal tissue.
FIG. 3 is a vertical cross sectional view taken on line 3—3 of FIG. 2.

Briefly stated, the present invention provides a jet injection system in which the depth of penetration is limited by injecting a plurality of jets such that the axes of jets intersect at or below the skin. The impact of the streams against one another dissipates the energy within each jet thereby spreading out the material with the streams and reducing further penetration.

In the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

Referring now to the figures and particularly in FIG. 1 is shown a spraying apparatus 10 that includes a supporting handle 12 for positioning a nozzle 14 with respect to the tissue 16 (FIG. 2) that is being injected. The handle 12 is provided with a valve plunger 18 adapted to slide from right to left as seen in FIG. 1 when handle operating lever 20 is moved toward the left allowing liquid 24 stored in a vessel 26 to be pumped via duct 28 into a valve 22 and thence into nozzle 14 where it is expelled through a plurality of bored jet openings 30 as a plurality of streams 32 which converge when the machine is being used at a focal point 34 located externally of the nozzle.

As best seen in FIG. 2, the nozzle 14 comprises a cap 40 provided with screw threads 42 adapted to be threaded onto a nozzle mounting pipe 44. The cap 40 is provided with a reduced bore 46 defining a shoulder 48 that engages and securely holds a nozzle insert 50 preferably formed of a wear-resistant material such as tungsten-finishing steel. The insert 50 is provided in this case with three openings 30 all of which are appropriately aligned relative to one another to direct streams 32 to the focal point 34. The distance of the focal point from the exposed surface of the nozzle can be varied greatly between say one-sixteenth inch and an inch or more. The focal point 34 can be located at the surface or beneath the surface of the piece being injected, but not in the air space between the nozzle and the piece since the streams are disrupted by contact with one another and lose a substantial amount of their penetrating power. I prefer to have the jets 32 converge at a distance of around one-fourth inch from the exposed surface of the nozzle when the invention is applied in injection liquids into poultry. The size of the nozzle openings 30 for most purposes should be between about 0.005 and 0.050 inches in diameter.

The openings 30 can be formed in any suitable manner but I prefer to form them by a process known as spark discharge drilling. Using this process, holes 30 can easily be drilled with a diameter of 0.014 inches or smaller.

The pump used for withdrawing the liquid 24 from reservoir 26 is indicated generally by the numeral 60. It consists, in this instance, of a reciprocating pump operated by compressed air supplied through line 62. The resulting reciprocation of a piston 64 raises and lowers the connecting rod 66 which is in turn connected to a piston (not shown) within a cylinder 68. The reciprocation of the piston within the cylinder 68 together with appropriate valving draws the liquid 24 in through an inlet duct 70 and expels the liquid through the line 28 as described above. While a variety of different kinds of pumps can be employed, one suitable pump is a reciprocating pump operated by compressed air.

The pumping pressure will, of course, depend upon the application for which the nozzle is designed. In injecting liquids into poultry products, it is preferred to operate at pressures between about 1,000 and 2,000 p.s.i., 1,500 p.s.i. being typical.

The jet can be started or stopped either manually (in the event a handle 12 of the type described above is used) or automatically. Where the jet is automatically pulsed, good results were achieved operating at 1,500 p.s.i. with one-tenth second valve-open pulses at intervals of 3 seconds through a three-hole nozzle of a one-fourth inch focal length with bored openings of 0.014 inches in diameter.

In operation, the air supplied through line 62 to the pump 60 thereby forces the liquid 24 at the requisite pressure through line 28 to the valve 22. The nozzle 14 is then placed at the proper distance, e.g., one-eighth inch from the surface of the piece 16 being injected. The valve 22 is then opened for the desired period of time allowing the converging jets 32 to strike the surface of the piece being injected. At a pressure of between 1,000 and 2,000 p.s.i., the liquid jets 32 will easily puncture the skin, penetrate beneath the surface and converge at point 34. The disrupting effect caused by the jets striking one another at the focal point 34 was found to break up the streams into a rather random fan-shaped spray 80 that has much less penetrating power than the original jets 32. While the spray 80 may penetrate a short distance, it is easily stopped by discontinuities in the tissue such as a connective tissue 82 surrounding a muscle bundle.

The invention has been found effective in limiting the depth of the penetration of jets expelled at sufficiently high pressure to easily penetrate the meat product being treated for the purpose of introducing tenderizing or flavoring materials. The invention thus reduces the chances of the injected liquid being expelled from the opposite side of the piece. It also facilitates diffusion of the injected liquid at a selected depth along lines extending laterally from the axis along which the liquid material is injected.

While the invention has a variety of applications, it has been described herein particularly in connection with the injection of liquids into poultry for improving the texture and taste, e.g., in chicken sold for retail consumption. The invention may, however, be applied in the injection of medicinal substances into animals.

The invention will be better understood by reference to the following examples:

EXAMPLE I

Using the apparatus described hereinabove and illustrated in the figures, a solution consisting on a weight basis of 94.5 percent water, 0.1 percent chicken flavor, 1.4 percent monosodium glutamate, 3.0 percent salt, and 1.0 percent butter flavor was injected at a pressure of 1,500 p.s.i. through a nozzle having 0.014 inch nozzle openings positioned to intersect at a distance of about one-fourth inch from the face of the nozzle. About 3 pounds of the mixture were injected for each 100 pounds of chicken meat injected. The resulting product was baked and was found to have a good flavor.

EXAMPLE II

Another run was conducted similar to Example I except that the injected solution consisted of 90 percent water, 3.0 percent salt, 2.0 percent MSG, 1.0 percent onion powder, 3.0 percent celery salt, and 1.0 percent polyphosphate.

This composition produced a very good flavor as judged by standard taste tests.

EXAMPLE III

A solution consisting of 100 percent melted butter was injected as described in Example I into fresh poultry meat. After being cooked, the taste was very good and a very rich flavor was noted.

EXAMPLE IV

The apparatus described in the figures is modified to provide a timer-operated solenoid for moving the plunger 18.

To measure the accuracy with which the liquid could be delivered through eight different nozzles, the amount of liquid expressed in grams expelled during a period of 2 seconds was measured at five different pressures. The results obtained are as follows:

| | Pressure, p.s.i. | | | | | | | | | | | | | |
|---|---|---|---|---|---|---|---|---|---|---|---|---|---|---|
| | 950 | | | 1,190 | | | 1,428 | | | 1,666 | | | 1,904 | |
| Run | 1 | 2 | 3 | 4 | 5 | 6 | 7 | 8 | 9 | 10 | 11 | 12 | 13 | 14 |
| Nozzle: | | | | | | | | | | | | | | |
| 1 | | 6 | 6 | | 11 | 11 | | 12 | 12 | | 13 | 13 | 13 | 13 |
| 2 | | 9 | 9 | | 10 | 10 | | 14 | 14 | | 15 | 15 | 17 | 17 |
| 3 | | 17 | 17 | | 18 | 18 | | 20 | 20 | | 22 | 22 | 26 | 26 |
| 4 | | 10 | 10 | | 11 | 11 | | 13 | 13 | | 14 | 14 | 20 | 20 |
| 5 | 25 | 25 | 25 | 28 | 27 | 28 | | 30 | 30 | | 34 | 34 | 35 | 35 |
| 6 | 22 | 23 | 22 | | 25 | 25 | | 25 | 25 | | 30 | 30 | 31 | 31 |
| 7 | | 36 | 36 | | 44 | 44 | | 44 | 44 | 52 | 53 | 52 | 52 | 52 |
| 8 | | 34 | 34 | 38 | 40 | 40 | 40 | 39 | 40 | | 49 | 49 | 48 | 48 |

The table shows that repeatable results can be obtained. For example, nozzle number 5 at a pressure of 950 p.s.i. in three separate runs expelled 24,25,25 grams of water respectively.

EXAMPLE V

A nozzle of the type described in Example I is connected with an electrically timed solenoid operating the plunger 18 as in Example IV. The nozzle is set to open every one-half second for a period of one-tenth second. The birds are moved longitudinally beneath the nozzle such that the nozzle produces a series of linearly arranged injections along the length of the bird.

I claim:

1. A method of limiting the depth of penetration of tenderizing and/or flavoring liquids injected into meat comprising injecting the liquid as a plurality of liquid jets each with a pressure of at least 950 p.s.i. to penetrate into the meat with the jets being oriented relative to one another to cause said jets to converge at a focal point beneath or at the surface of the meat whereby the impact of one jet upon another is adapted to disrupt the jets and thereby reduce the penetrating power of the liquid beyond the focal point.

2. The method of claim 1 wherein the liquid is expelled from a nozzle and the pressure of the liquid within the nozzle is at least about 1,000 p.s.i.

3. The process of claim 1 wherein the jet is turned on and off so as to operate periodically and said meat product being moved with respect to the nozzle along a lateral axis while the jet is turned off whereby the meat product is injected at a plurality of laterally spaced points.

4. The process of claim 1 wherein the liquid is an oil.

* * * * *